No. 762,668. PATENTED JUNE 14, 1904.
S. C. WEBB & I. WEIL.
CAR TRACTION DEVICE.
APPLICATION FILED SEPT. 26, 1903.
NO MODEL. 2 SHEETS—SHEET 2.
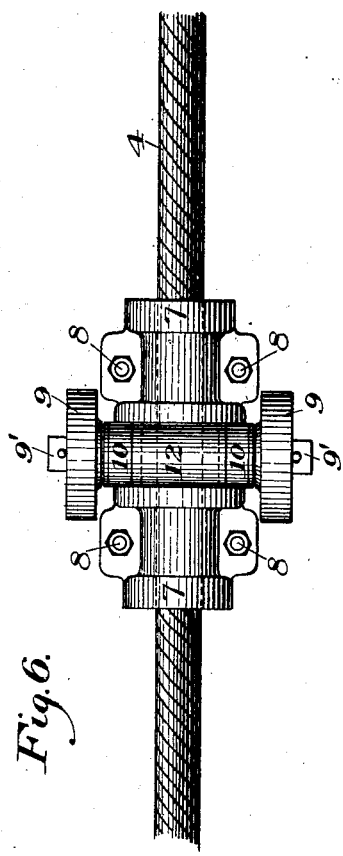
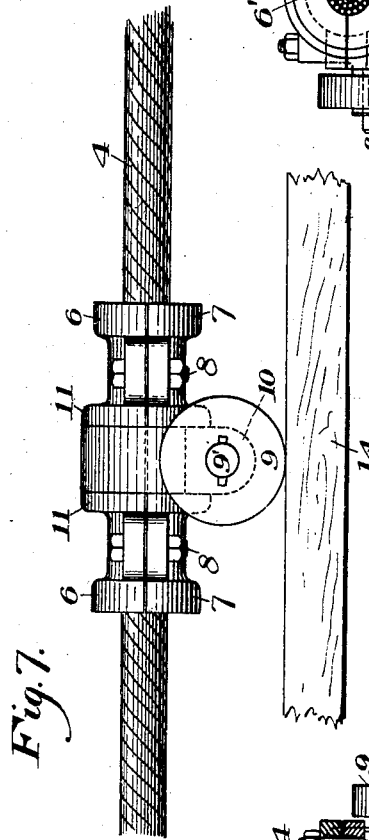
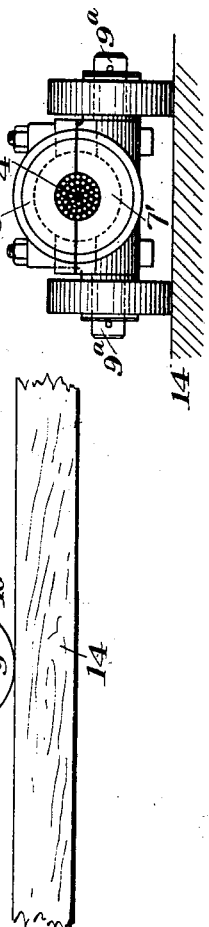
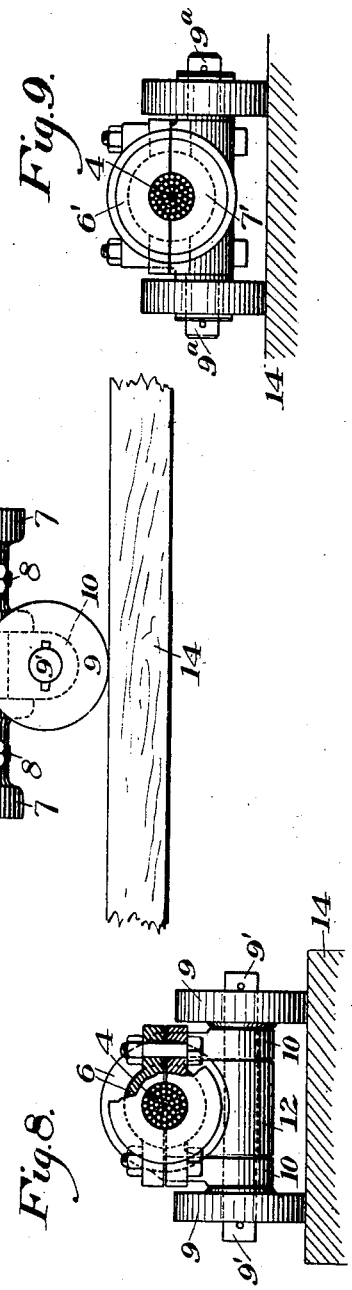
WITNESSES
INVENTORS No. 762,668.

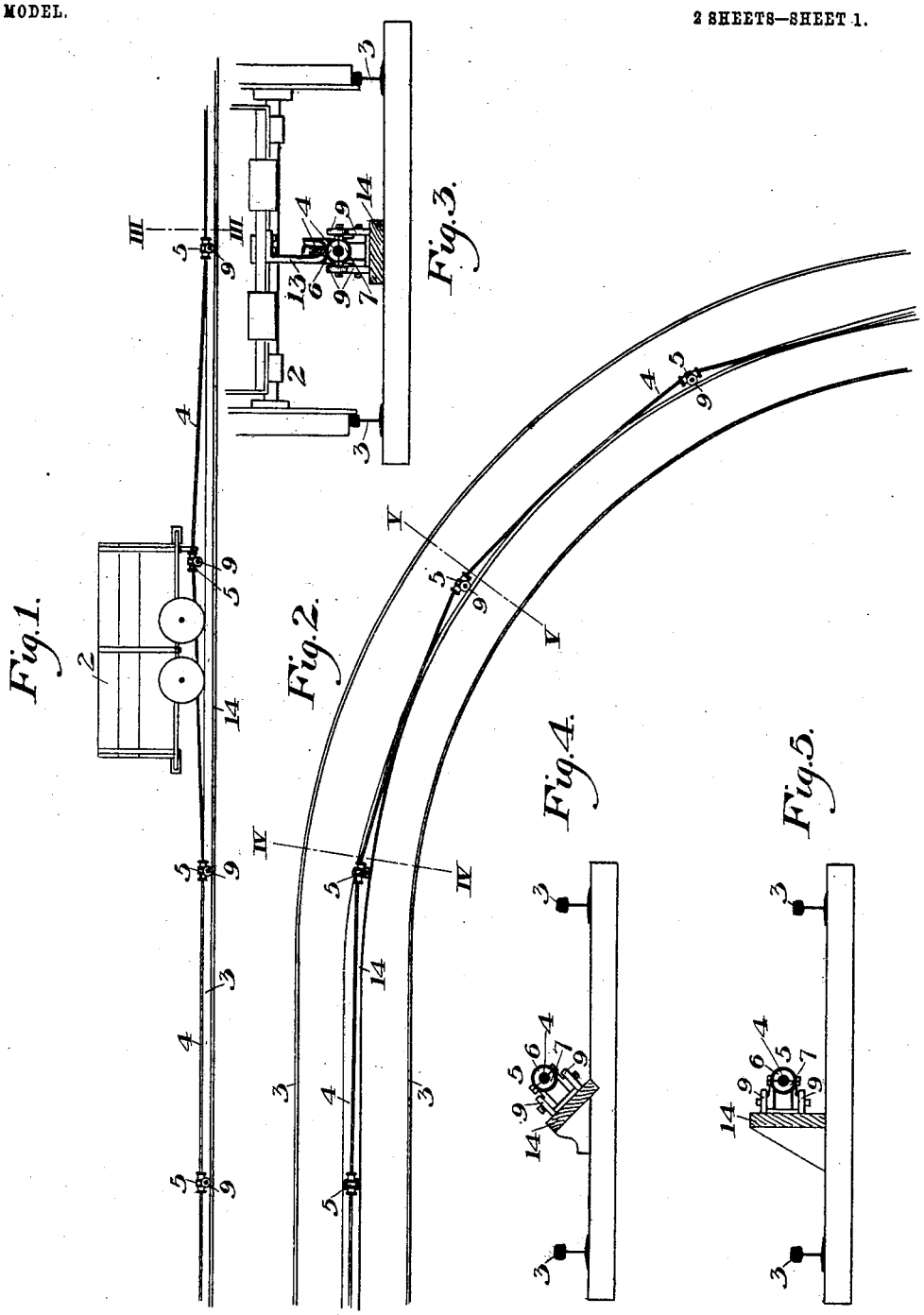

Patented June 14, 1904.

UNITED STATES PATENT OFFICE.

SAMUEL C. WEBB AND ISAAC WEIL, OF MONONGAHELA, PENNSYLVANIA.

CAR TRACTION DEVICE.

SPECIFICATION forming part of Letters Patent No. 762,668, dated June 14, 1904.

Application filed September 26, 1903. Serial No. 174,761. (No model.)

*To all whom it may concern:*

Be it known that we, SAMUEL C. WEBB and ISAAC WEIL, of Monongahela, in the county of Washington and State of Pennsylvania, have invented a new and useful Car Traction Device, of which the following is a full, clear, and exact description, reference being had to the accompanying drawings, forming part of this specification, in which—

Figure 1 is a side elevation of a car and traction cable provided with our improvement. Fig. 2 is a plan view of the cable on a curved portion of the track. Fig. 3 is a vertical cross-section of the track on a larger scale, the section being on the line III III of Fig. 1. Figs. 4 and 5 are like sections on the lines IV IV and V V of Fig. 2, showing the arrangement of the parts at curved parts of the track. The figures on Sheet 2 illustrate the connecting truck and cable. Fig. 6 is a bottom plan view. Fig. 7 is a side elevation. Fig. 8 is an end elevation of the truck, partly in section; and Fig. 9 is an end elevation of the truck, showing a modified construction.

Our invention provides a simple and effective means for coupling mine-cars and like cars to the traction-cable without injuring the cable and in such manner that connection can be quickly made and detached and that the operation of the car in passing curves will not be impeded.

The device is simple and contributes greatly to the ease of operating the traction system.

In the drawings, 2 represents a mine-car. 3 is the track, and 4 is the cable. At intervals along the cable are placed the coupling devices 5 5. As shown in Figs. 6 to 8, these consist, preferably, of clamp-sections 6 7, clamped upon the cable by bolts 8 and wheels 9, whose axle 9' is carried by a stirrup 10, which is placed around the sections between flanges 11 and fits loosely around the body of the clamp, a distance piece or block 12 being interposed between the axle and the lower section 7.

Other forms of clamp having wheels may be used. Thus, as shown in Fig. 9, the clamp is made of two sections 6' 7', clamped to the cable and having axle portions 9ª formed integrally upon the lower section of the wheel-carrying portion of the clamp. This portion is loose upon the clamp, as in the form just described. These couplings afford means for connecting the car detachably to the cable by placing the cable within a hook 13 on the car-frame, which will then engage one of the clamps.

As the cable moves along the track the wheels of the couplings ride upon a plank or rail 14, set between the rails of the track, and the wheels serve to support the cable and to diminish the friction. The coupling is connected to the car by bearing against the hook, and the wheeled portion of the coupling is free to turn laterally upon the coupling, and we therefore incline the rail 14 at the curves, as shown in Fig. 4, and at the middle portion of an abrupt curve preferably set it vertically, so as to afford an upright bearing for the wheels. The cable is thus guided perfectly around the curves of the track, and this capability of self-adjustment to the curves constitutes one of the distinguishing features of our invention.

We claim—

1. A coupling device for connecting cars to a traction-cable, consisting of a wheeled clamp secured to the cable and having a connection which directly engages the clamp, and a rail or guide for the clamp arranged to rotate the clamp laterally at curves; substantially as described.

2. A coupling device for connecting cars to a traction-cable, consisting of a sectional clamp secured to the cable, a connection secured to the car, arranged to directly engage the clamp, and a stirrup carrying a wheeled axle; substantially as described.

3. A coupling device for connecting cars to a traction-cable, consisting of sectional clamp secured to the cable, and a loosely-mounted stirrup carrying a wheeled axle; substantially as described.

4. A coupling device for connecting cars to a traction-cable, consisting of a sectional clamp secured to the cable, a stirrup carrying a wheeled axle, and a distance-piece between the lower section of the clamp and the axle; substantially as described.

5. In a cable system, a car having a depending hook, and a wheeled clamp arranged to engage the hook, said hook being directly engaged by said clamp, and a loosely-mounted wheeled support for said clamp, arranged to rotate laterally upon the clamp at curves, substantially as described.

6. A traction system having main rails, and an intermediate rail or guide, the plane of said intermediate rail or guide being rotated preferably through ninety degrees at curves, and a rope carrier adapted to run on said intermediate rail and to propel cars upon the main rails; substantially as described.

In testimony whereof we have hereunto set our hands.

SAMUEL C. WEBB.
ISAAC WEIL.

Witnesses:
JOHN MILLER,
H. M. CORWIN.